United States Patent [19]
Thompson et al.

[11] 4,082,419
[45] Apr. 4, 1978

[54] OPTICAL WAVEGUIDE COUPLERS

[75] Inventors: George Horace Brooke Thompson; David Francis Lovelace, both of Harlow, England

[73] Assignee: International Standard Electric Corporation, New York, N.Y.

[21] Appl. No.: 660,560

[22] Filed: Feb. 23, 1976

[30] Foreign Application Priority Data

Feb. 27, 1975 United Kingdom ............... 8244/75

[51] Int. Cl.² ............................................. G02B 5/14
[52] U.S. Cl. .............................. 350/96.12; 350/96.15
[58] Field of Search ..................... 350/96 WG, 96 C

[56] References Cited

U.S. PATENT DOCUMENTS

| 3,760,297 | 9/1973 | Thompson | 350/96 R X |
| 3,883,219 | 5/1975 | Logan et al. | 350/96 WG |
| 3,976,358 | 8/1976 | Thompson | 350/96 WG X |

*Primary Examiner*—John K. Corbin
*Assistant Examiner*—John D. Lee
*Attorney, Agent, or Firm*—John T. O'Halloran; Peter C. Van Der Sluys

[57] ABSTRACT

An optical directional coupler provides good guidance in the lateral direction by the use of projecting rib optical waveguide structure. One embodiment enables the use of sharper curves in the integrated optical circuitry with reduced optical loss.

2 Claims, 5 Drawing Figures

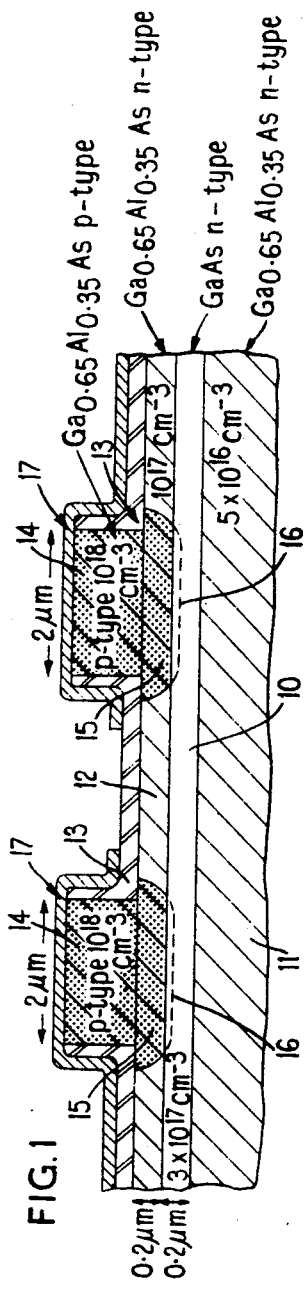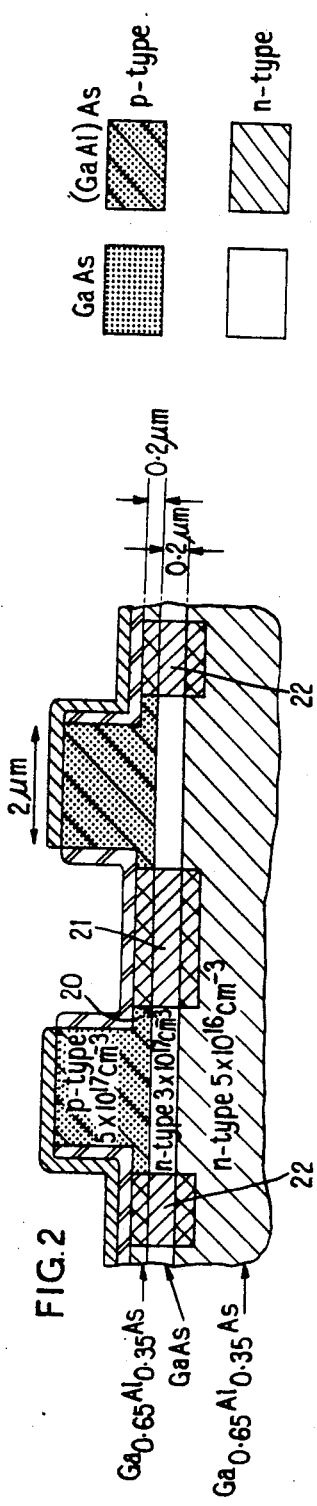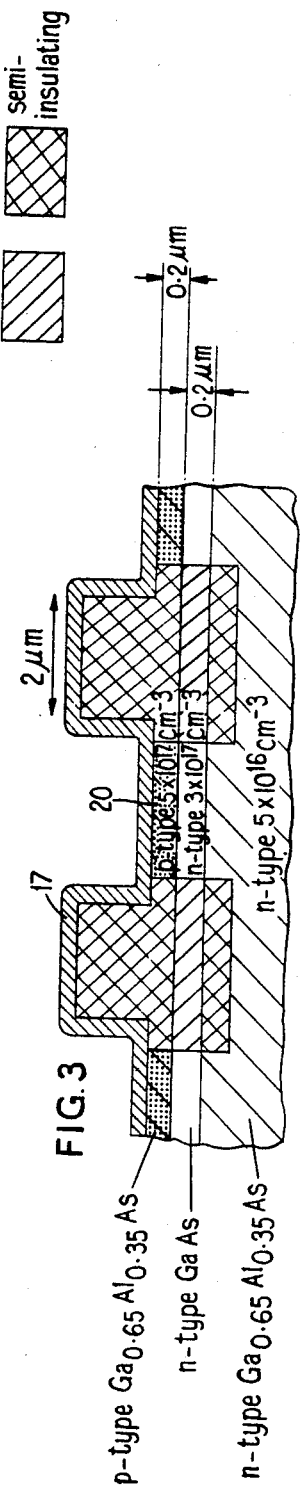

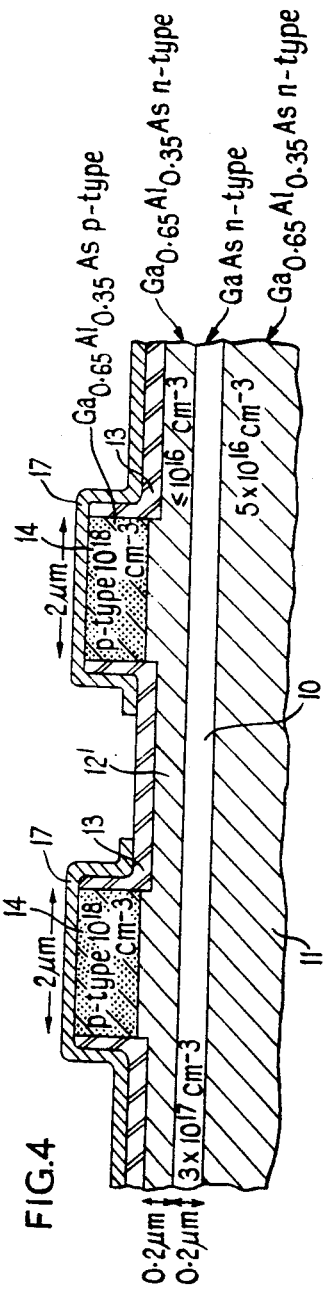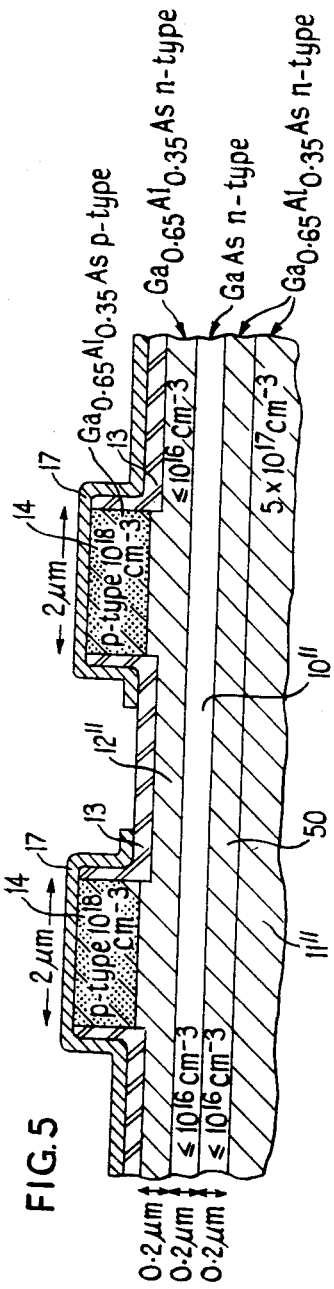

OPTICAL WAVEGUIDE COUPLERS

BACKGROUND OF THE INVENTION

This invention relates to variable coupling optical waveguide couplers, and is an improvement in, or modification of, the couplers described in U.S. Pat. No. 3,976,358 issued Aug. 24, 1976 and assigned to the common assignee of the instant invention.

The aforementioned application describes couplers fabricated in semiconductive material in which the coupling between a pair of optical waveguides may be altered by reverse biasing at least one p-n junction which is located so that under conditions of reverse bias a depletion region is established which, on the n-type side, extends into or through one of the waveguides or the region between them. A problem in the design of such couplers is the choice of suitable carrier concentrations to provide adequate optical guidance in the lateral direction. Optical guidance in one direction is provided by two heterojunctions, but in the lateral direction guidance is provided by refractive index differences between regions of relatively high and relatively low free electron concentration. A large difference in concentration provides strong guidance, but has the disadvantage that a high free carrier concentration produces undesirably high optical loss. In the present invention this problem is circumvented by adopting an alternative way of achieving optical guidance in the lateral direction. If significant use is to be made of refractive index changes brought about by free carrier removal, it is still however necessary to select a doping level which is high enough to produce an adequate change of refractive index when the depletion region is established, but yet is not so high as to make the depletion region very thin compared with the thickness of the waveguides.

SUMMARY OF THE INVENTION

This invention discloses structures of couplers in which lateral optical confinement, that is optical confinement in a direction normal to that provided by the heterojunctions, is provided by a protruding rib structure.

According to the present invention there is provided a semiconductive double heterostructure optical waveguide coupler whose double heterostructure has a higher refractive index middle layer providing optical confinement in one direction for two or more optically coupled waveguides for which optical confinement in an orthogonal direction is provided by protruding ribs formed in one surface of the coupler, the coupler having one or more p-n junctions located in the vicinity of the guides such that the application of a reverse bias thereacross creates one or more depletion regions which extend into or through one or more of the waveguides or one or more of the optical coupling regions between waveguides.

BRIEF DESCRIPTION OF THE DRAWINGS

FIG. 1 is a schematic cross-sectional view of a first embodiment of an optical waveguide coupler according to this invention;

FIGS. 2 and 3 are schematic cross-sectional views of two further embodiments of the optical waveguide coupler of FIG. 1; and FIGS. 4 and 5 are cross-sections through two modified versions of the embodiment of FIG. 1.

DESCRIPTION OF THE PREFERRED EMBODIMENT

Each of the couplers now to be described has a pair of waveguides which are optically coupled, but it will be evident that the principles of construction and operation are such that the designs can be extended to provide couplings between three or more waveguides. The application of a reverse bias across one of the p-n junctions of the coupler produces refractive index changes which affect the coupling between the guides. Such refractive index changes may arise in part as a result of the electro-optic effect produced by the electric field appearing across the depletion region, and in part as a result of the sweeping of free carriers from the depletion region. In gallium arsenide and gallium aluminum arsenide this second effect, which is isotropic, is much more pronounced on the n-type side of the p-n junction on account of the much greater effective mass of electrons than of holes. For this reason it is generally preferred to employ constructions in which it is the portion of the depletion region on the n-type side of the p-n junction that is used to modify the coupling. The coupling between two waveguides can be modified by altering their refractive index, or that of the intervening material, or by altering the refractive index of only one of the guides so as to disturb their matching. This is discussed further in the application previously referred to together with a discussion of how the electro-optic effect is related to crystal orientation and polarization of the propagating light.

Referring now to FIG. 1, a 0.2 $\mu$m thick layer 10 of n-type gallium arsenide having a free carrier concentration of about $3 \times 10^{17}$ cm$^{-3}$ is grown on a substrate 11 of n-type Ga$_{0.65}$Al$_{0.35}$As having a free carrier concentration of about $5 \times 10^{16}$ cm$^{-3}$. Then a further n-type layer 12 of Ga$_{0.65}$Al$_{0.35}$As is grown on layer 10. Layer 12 is also about 0.2 $\mu$m thick and has a carrier concentration of about $10^{17}$ cm$^{-3}$. The final grown layer is a zinc doped p-type layer of Ga$_{0.65}$Al$_{0.35}$As having a carrier concentration of $10^{18}$ cm$^{-3}$ grown on top of layer 12. This p-type layer, which is typically about 1 $\mu$m thick, is masked and then selectively anodized to leave a native oxide layer 13 through which protrude two ribs 14 of p-type GaAlAs typically 2 $\mu$m wide and spaced apart by 2 to 3 $\mu$m.

The device is next heated so as to cause diffusion of the zinc p-type dopant from the ribs 14 into the underlying portions of layer 12. The initial doping level of the ribs is about ten times greater than that of layer 12 and hence the diffusion converts the portions 15 underlying the ribs into p-type material. Normally the diffusion is arranged so that the diffusion fronts 16 just penetrate into layer 10. The progression of the p-n junctions is, however, arrested at the interface between layers 10 and 12 by the greater doping level of layer 10.

The ribs 14 are provided with individual metallization electrode layers 17 to co-operate with an electrode (not shown) attached to the substrate so that a reverse bias may be applied across either or both p-n junctions.

This structure may be compared with that described in the aforementioned patent application incorporated herein by way of reference with particular reference to FIG. 4 of that application. The advantage of being able to reduce free carrier optical loss by the use of lower doping levels has previously been referred to. Another advantage of the present construction is that the zinc diffusion is very much shallower. In the present structure the thickness of layer 12 is determined by the need to allow a small amount of optical energy propagating in the guides to penetrate into the region between them and thus provide optical coupling. In the device of FIG. 4 of the aforementioned patent application the corresponding layer (layer 41) has to be much thicker because it has to be thick enough to prevent its upper surface from significantly affecting optical guidance within the waveguides themselves. A further difference between the two structures is that in this one the guidance in the lateral direction can be made much stronger with the result that the guides can tolerate considerably sharper radii of curvature. It may be noted that a useful consequence of proceeding to narrower ribs is that the structure can accept the use of a correspondingly narrower layer 12 with the result that the problems of lateral Zn diffusion do not become significantly larger.

The structure of the coupler depicted in FIG. 2 is basically similar to that of the FIG. 1 coupler except for the omission of the n-type layer 12. In the coupler of FIG. 1 the region of layer 12 between the ribs is effective in providing coupling between the guides by allowing optical energy propagating in layer 10 to penetrate an appreciable distance beyond the edges of the ribs. In this coupler this function is provided by limiting the anodization of the p-type layer to leave a portion 20 extending between the two ribs. This portion provides an undesirable electrical connection between the two ribs which is disrupted by converting a region 21 to semi-insulating material by proton bombardment. The proton-bombardment may also be used to convert regions 22 to semi-insulating material in order to reduce capacitive effects.

The manufacture of this coupler of FIG. 2 does not require any diffusion process step to translate the p-n junction to the heterojunction and hence the gallium arsenide layer 10 can be grown to a lower free carrier concentration since it is not required to halt the advance of the p-n junction.

The coupler depicted in FIG. 3 has a structure very similar to that of the coupler depicted in FIG. 2, with the primary difference that the ribs are proton-bombarded while the intervening region is masked. The anodized layer is dispensed with so that direct electrical contact is established between the metallization 17 and the portion 20 between the ribs. The resulting coupler is operated in the same way as that depicted in FIG. 1 of U.S. Pat. No. 3,976,358 hereinbefore referred to.

The constructions of couplers to be described with reference to FIGS. 4 and 5 are essentially variations of the coupler previously described with reference to FIG. 1. The FIG. 1 construction involves the use of a highly mobile p-type dopant which can be diffused out of the material of the rib to cause the p-n junctions to be translated to the region of the upper surface of the higher refractive index guiding layer 10. A possible dopant for this purpose is zinc, but the relatively high volatility of zinc imposes some unwanted constraints upon the conditions used in the liquid phase epitaxial growth schedule. The constructions of FIGS. 4 and 5 are designed to avoid this requirement for the use of a mobile dopant.

The construction of the coupler of FIG. 4 is identical with that of the coupler of FIG. 1 except three differences. Firstly layer 12' has a lower carrier concentration than the corresponding layer 12, typically not more than $10^{16}$ cm$^{-3}$ instead of being about $10^{17}$ cm$^{-3}$. Secondly the material from which the two ribs are constructed is made of germanium doped material instead of zinc doped. Thirdly there is no heating schedule corresponding to that used in the FIG. 1 construction to cause the downward translation of the p-n junctions.

Since in this construction the p-n junctions remain spaced from the higher refractive index optical guiding layer 10 by the intervening layer 12', some of the electric field associated with the application of a reverse bias across one of these junctions is generated in layer 12' instead of layer 10, where it is primarily required. However, by choosing the use of a low doping level for layer 12' there is little reduction in field across layer 12' and the field that can be generated in layer 10 can be arranged to be within at least 10%, and typically somewhere in the region of 5%, less than that close to the p-n junction.

The construction of the coupler of FIG. 5 is similar to that of the coupler of FIG. 4 but is designed to make use of the electro-optic effect of a reverse biased junction. For this purpose the substrate layer 11'' which is relatively highly doped at typically about $5 \times 10^{17}$ cm$^{-3}$ is spaced from the guiding layer 10'' by an intermediate low doped layer 50 having the same composition as the substrate layer 11'', but a carrier concentration of typically about $10^{16}$ cm$^{-3}$. This layer is typically about the same thickness as the guiding layer 10'' and the covering layer 12'', both of which also have a carrier concentration typically about $10^{16}$ cm$^{-3}$.

The use of this low carrier concentration in the three thin layers 12'', 10'' and 50 backed by the more highly doped material of the substrate 11'' ensures that, when a reverse bias is applied across the junction, the guiding layer lies in a relatively high electric field region. When the depletion region is established by the application of this bias, the removal of free carriers from the underlying portion of layer 10'' has relatively little effect upon the refractive index of that region because the number of carriers removed is restricted by the low initial carrier concentration. In this configuration the main contribution to refractive index change for light propagating in the guides is instead designed to be that provided by the electro-optic effect.

One of the features of relying virtually exclusively upon the electro-optic effect is that the application of a reverse bias does not significantly effect the transmissivity of the underlying guiding layer. When significant use is made of the refractive index changes brought about by free carrier removal, this is no longer the case because of the absorption effects of free carriers. This difference assumes significance if the coupling is to be controlled by reverse biasing the p-n junction associated with one waveguide without applying an equal reverse bias to the other. In this mode of operation the energization produces an attenuation mismatch between the guides making it no longer possible to switch the coupler between a first state in which one of the input part is coupled exclusively with one of the output ports, and a second state in which that input port is exclusively coupled with the other. It will be possible to decouple one of the output ports in the unenergized (transmissivity matched) state, but in the other state there will always be residual coupling with the other output port.

It will be appreciated that the same considerations also apply to the coupler previously described with reference to FIG. 2, and hence there may be applications for which a modified form is required having a thin low carrier concentration low under layer, corresponding to layer 50, interposed between a low carrier concentration high index guiding layer and a high carrier concentration low index substrate. The same considerations do not apply to the FIG. 3 configuration because removal of free carrier absorption from the coupling region between the two waveguide channels does not upset the transmissivity matching of the channels themselves.

In the configurations of coupler described with reference to FIGS. 1, 2, and 3 the doping level of the higher refractive index optical guiding layer situated immediately under the p-n junction(s) is preferably chosen in relation to its thickness so that its free carriers are virtually entirely removed at a reverse bias just beneath the breakdown value. It is found, however, that slightly more carriers can be removed by employing a thinner, more heavily doped layer, and that therefore improved free carrier interaction can be provided by the use of a composite refractive index optical layer. This composite layer has the same composition throughout but has a highly doped upper part adjacent the p-n junction(s) and underneath this, a lightly doped part. Typically the highly doped part has a carrier concentration of $10^{18}$ cm$^{-3}$, and the lightly doped part one of $10^{16}$ cm$^{-3}$.

With those of the above described couplers that are designed to make use of changes of refractive index brought about by removal of free carriers, a preferred crystal orientation is that in which the heterojunctions lie in (100) planes, and the guides extend in (100) directions. The reason for this is that the electro-optic effect is in general polarization sensitive, but with this orientation the electro-optic effect produces no refractive index change for light propagating along the guides {(100) direction} irrespective of polarization. Clearly a different crystal orientation is required for those of the couplers designed to make use of the electro-optic effect.

In any of the above described structures layer 10 can be made of GaAlAs provided that the other layers have a significantly higher aluminum concentration in order to provide the requisite refractive index differential.

It is to be understood that the foregoing description of specific examples of this invention is made by way of example only and is not to be considered as a limitation on its scope.

What is claimed is:

1. A semiconductive heterostructure optical waveguide coupler comprising:
   a first layer of semiconductive material having first and second major surfaces;
   a plurality of protruding ribs of semi-conductive material formed on said first surface, said ribs defining a plurality of optical waveguides for providing optical confinement to light;
   means for applying a reverse bias across said ribs and said first layer to provide a depletion region within said first layer for altering the optical coupling between the waveguides; and
   a plurality of regions of semi-insulating material within the portions of said first layer intermediate said plurality of protruding ribs.

2. The optical waveguide coupler of claim 1 wherein said first layer comprises n-type GaAs and the semiconductive material within the ribs comprises p-type GaAlAs.

* * * * *